Figure 1:
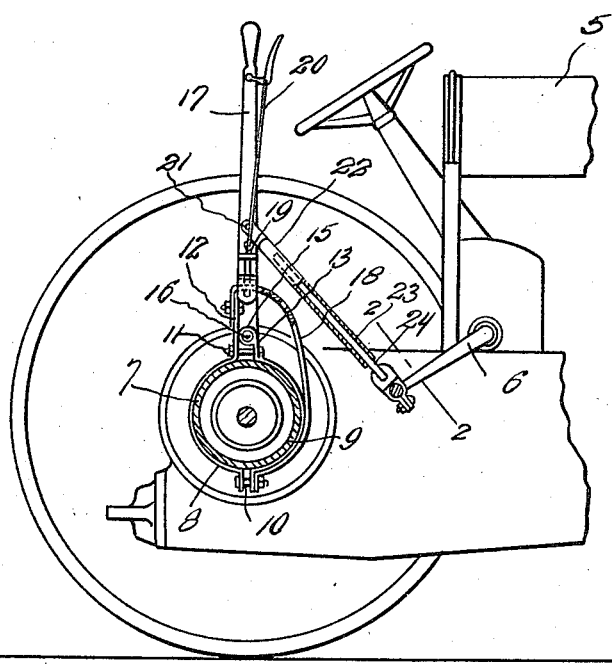

Nov. 11, 1924.

H. DE MAY 1,514,838

HAND ACTUATING MEANS FOR TRACTOR CLUTCH PEDALS

Filed Feb. 16, 1924

H. De May,
Inventor

By Clarence O'Brien
Attorney

Patented Nov. 11, 1924.

1,514,838

UNITED STATES PATENT OFFICE.

HERMAN DE MAY, OF WILLIAMSON, NEW YORK.

HAND ACTUATING MEANS FOR TRACTOR CLUTCH PEDALS.

Application filed February 16, 1924. Serial No. 693,326.

*To all whom it may concern:*

Be it known that I, HERMAN DE MAY, a citizen of the United States, residing at Williamson, in the county of Wayne and State of New York, have invented certain new and useful Improvements in Hand Actuating Means for Tractor Clutch Pedals, of which the following is a specification.

This invention relates generally to the art of tractors and has more particular reference to a means whereby the clutch pedals of these tractors may be depressed by a hand lever and maintained in said depressed condition without requiring the attention of the operator in order that power may be taken from the power take off shaft of the tractor without requiring the attention of two or more operators.

The primary object of the present invention resides in the provision of a hand operating means of the character set forth that may be readily and inexpensively applied to practically all forms of tractors now upon the market, and one that will operate efficiently under all conditions.

An additional object of the present invention resides in the provision of a hand actuating means for clutch pedals of tractors that will not interfere with the operation of these pedals by foot whenever the same become necessary.

With the foregoing and other objects in view as the nature of the invention is better understood, the same comprises the novel form, combination, and arrangement of parts hereinafter more fully described, shown in the accompanying drawing and claimed.

Figure 2:
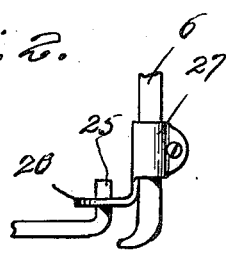

In the drawing, wherein like reference characters indicate corresponding parts throughout both of the views:

Figure 1 is a fragmentary longitudinal sectional view of a well known form of tractor equipped with my novel hand actuated means for the clutch pedal thereof, and Figure 2 is a fragmentary detail sectional view taken substantially upon the line 2—2 of Figure 1, for disclosing more clearly the connection means between the clutch pedal and sliding rod that forms an essential part of the present invention.

Now having particular reference to the drawing, 5 indicates generally a tractor, 6 the clutch pedal for the clutch mechanism thereof, and 7 the usual rear axle housing of said tractor.

My invention per se contemplates the provision of a pair of sheet metal clamp members 8 and 9 that are of general semicircular shape and that are adapted to be engaged over said axle housing 7 in a manner as clearly shown in Figure 1. The opposite ends of these clamp sections are to be rigidly secured together as at 10 and 11.

The upper end of the rearmost clamp section 8 is formed with a vertical extension 12 while the upper end of the foremost clamp section 9 is formed with a relatively shorter vertical extension 13 that is formed with a flattened and eyed portion 14 to which is pivotally secured as at 16, the lower end of a handle lever 17, that extends upwardly to a point adjacent the driver's seat of the tractor (not shown).

Secured at its opposite end to the vertical extension 12 of said clamp section 8 and to the lower end of the foremost clamp section 9 through the medium of the connection 10 between these ends of said clamp section is a curved segment 18 that is formed from a bar of sheet material bent into the general form shown in Figure 1.

This handle lever 17 carries at a point adjacent the segment 18, a locking detent 19 in the form of a sliding bolt that is adapted to be selectively engaged in a pair of spaced openings in said segment for maintaining the hand lever in any one of two positions, and in this instance, said detent 19 may be controlled by a well known form of hand actuated mechanism 19 that is also carried by said handle lever.

Pivoted at one end as at 21 to said handle lever 17 at a point above the detent 19 is a relatively long rod 22 of circular cross section that is provided throughout almost its entire length with a pocket 23 that opens at the front end of said rod for receiving a solid rod 24, that is bent laterally inwardly at its front end as at 25, for engagement within an opening formed in a plate 26. This plate 26 is in turn formed laterally upon a sheet metal clamp 27 that is adapted to be rigidly secured to the before mentioned clutch pedal 6.

It will be obvious from the foregoing that by pushing forwardly upon the lever 17, after the detent 19 has been released from the rearmost opening in said segment 18, the clutch pedal 6 will be depressed and maintained in this depressed condition by allowing this detent 19 to engage within the foremost opening of the segment 18.

However, when the hand operating mechanism for the clutch pedal is in the position shown in Figure 1, said clutch pedal may be readily depressed by foot, it being obvious that the sliding connection between the solid rod 24 and the socketed rod 22 will allow for said depression of the clutch pedal.

The specific operation, together with numerous advantages of a hand operating mechanism for tractor clutch pedals of this character will be at once appreciated by those skilled in the art, and even though I have herein set forth the most practical embodiment of my invention with which I am at this time familiar, it is nevertheless to be understood, that minor changes may be made in the invention without departing from the spirit and scope of the appended claim.

Having thus described my invention, what I claim as new and desire to secure by Letters Patent is:

In a hand operated means for tractor clutch pedals, a clamp rigidly secured upon the rear axle housing of the tractor, a hand lever pivotally secured at its lower end to said clamp, a segment rigidly secured at its opposite end to said rear axle housing clamp and formed with a pair of spaced openings, a sliding hand operated detent carried by said hand lever and adapted for selective engagement within either one of said openings for maintaining said hand lever in a depressed or retracted position, a socketed rod pivotally secured at one end to said hand lever, a clamp member upon the tractor clutch pedal, a solid rod pivotally secured at one end to said clamp and adapted for sliding engagement within the socket of said rod that is pivoted to said hand lever whereby said foot pedal may be depressed by foot and whereby a movement of said hand lever in a forward direction will also cause the depression of said foot pedal.

In testimony whereof I affix my signature.

HERMAN DE MAY.